United States Patent
Kudelski

(10) Patent No.: US 12,361,802 B2
(45) Date of Patent: Jul. 15, 2025

(54) HAPTIC FEEDBACK DEVICE AND HAPTIC FEEDBACK METHOD

(71) Applicant: Nagravision Sàrl, Cheseaux-sur-Lausanne (CH)

(72) Inventor: Estelle Kudelski, Cheseaux-sur-Lausanne (CH)

(73) Assignee: Nagravision Sàrl, Cheseaux-sur-Lausanne (CH)

( * ) Notice: Subject to any disclaimer, the term of this patent is extended or adjusted under 35 U.S.C. 154(b) by 133 days.

(21) Appl. No.: 18/462,036

(22) Filed: Sep. 6, 2023

(65) Prior Publication Data

US 2024/0078881 A1   Mar. 7, 2024

(30) Foreign Application Priority Data

Sep. 7, 2022 (EP) ..................................... 22194469

(51) Int. Cl.
*H04B 3/36* (2006.01)
*G08B 6/00* (2006.01)

(52) U.S. Cl.
CPC ..................................... *G08B 6/00* (2013.01)

(58) Field of Classification Search
CPC ........... G08B 6/00; G06F 3/011; G06F 3/016; G06Q 30/0623; G06Q 30/0643
See application file for complete search history.

(56) References Cited

U.S. PATENT DOCUMENTS

| | | | |
|---|---|---|---|
| 11,809,629 B1* | 11/2023 | Segil | ....................... G06F 3/016 |
| 11,995,240 B2* | 5/2024 | McMahon | .............. G06F 3/014 |
| 2014/0071079 A1 | 3/2014 | Heubel et al. | |
| 2019/0279284 A1 | 9/2019 | Sunday et al. | |

OTHER PUBLICATIONS

European Search Report issued Feb. 13, 2023 in European Application 22194469.7 filed on Sep. 7, 2022, 11 pages.

* cited by examiner

*Primary Examiner* — Toan N Pham

(74) *Attorney, Agent, or Firm* — Oblon, McClelland, Maier & Neustadt, L.L.P.

(57) ABSTRACT

A haptic feedback device that includes an input unit for receiving remote object data, at least one feedback surface arranged to be touched or sensed by a user, at least one haptic actuator arranged for providing a change on the feedback surface, and a control unit that is connected to the input unit to receive the remote object data, connected to the haptic actuator, and arranged to control the haptic actuator according to the received remote object data so as to provide haptic feedback to the user.

16 Claims, 2 Drawing Sheets

[Fig. 1]
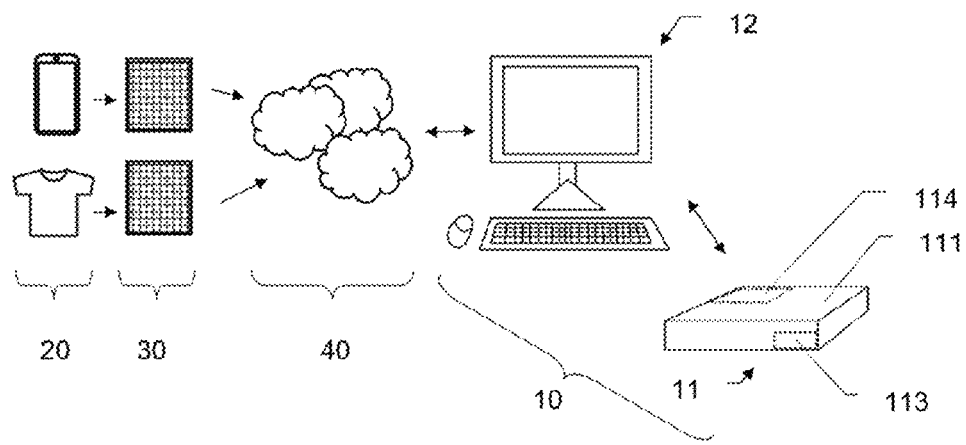
[Fig. 2]
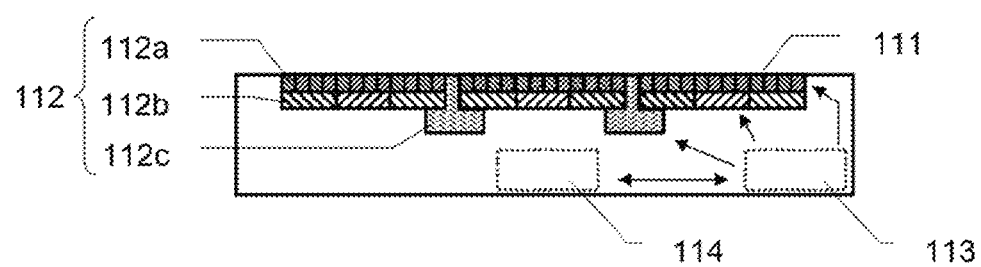
[Fig. 3a]
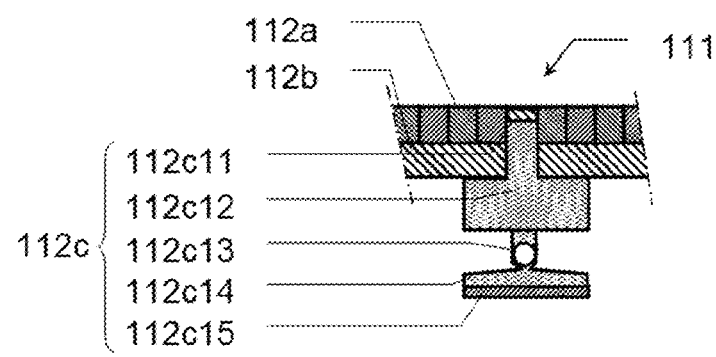

[Fig. 3b]
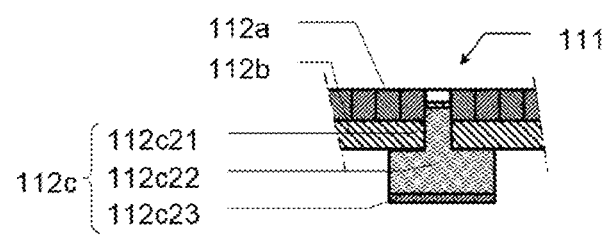

HAPTIC FEEDBACK DEVICE AND HAPTIC FEEDBACK METHOD

The present invention belongs to the field of providing a user with an enriched experience when user is looking at images of remote objects. In particular the present invention relates to the field of internet sales, where the user can generally access only to pictures of a product before purchase.

While a user can generally access to a plurality of pictures of a product and a detailed written description before buying an object via internet, the other senses (and in particular the sense of touch) are left aside. This lack of haptic feedback is a major drawback compared to in-store sales where the user can touch the product before purchase.

The present invention aims to address the above-mentioned drawbacks of the prior art, and to propose first a haptic feedback device arranged to enrich the experience during the process of purchasing or reviewing a remote object.

In this aim, a first aspect of the invention is a Haptic feedback device, comprising:
an input unit for receiving remote object data,
at least one feedback surface arranged to be touched or sensed by a user,
at least one haptic actuator arranged for providing a change on the feedback surface,
a control unit:
  connected to the input unit to receive the remote object data, and
  connected to the haptic actuator, and
  arranged to control the haptic actuator according to the received remote object data so as to provide haptic feedback to the user.

The haptic device according to the above embodiment comprises at least one haptic actuator which is controlled by the control unit per the received remote object data. This allows to provide a control of the haptic actuator to modify the feedback surface so as to reproduce a surface, a touch experience of the remote object. The feedback surface being changed by the haptic actuator to imitate the touch feeling of the remote object, the user can decide to purchase (or not) the remote object with more objective criteria.

In other words, the invention relates to a haptic feedback device, comprising:
an input unit for receiving remote object data,
at least one feedback surface arranged to be touched or sensed by a user,
at least one haptic actuator provided on or in vicinity of the feedback surface,
a control unit:
  connected to the input unit to receive the remote object data, and
  connected to the haptic actuator, and
  arranged to control the haptic actuator according to the received remote object data so as to provide haptic feedback to the user.

The invention can be further defined by the below features, taken alone or in combination.

According to an embodiment, the at least one haptic actuator is chosen in the list of:
a texture feedback actuator,
a temperature feedback actuator,
a humidity feedback actuator.

All these kinds of actuators can help to reproduce physical characteristics of the remote object:

roughness, structure, texture, 3D relief . . . are parameters which can be imitated with the texture feedback actuator, capacity of heating or cooling, thermal conductivity, thermal capacity . . . are parameters which can be imitated with the temperature feedback actuator, soaking capacity, moisture level, sponging capacity . . . are parameters which can be imitated with the humidity feedback actuator.

According to an embodiment, the texture feedback actuator comprises a piezoelectric actuator. A piezoelectric actuator can generate a movement or displacement when it is supplied with an electric signal.

According to an embodiment, the temperature feedback actuator comprises a heating or cooling element.

According to an embodiment, the temperature feedback actuator comprises a Peltier element and/or a resistive element. A Peltier element can heat or cool a given surface when it is supplied with an electric signal.

According to an embodiment, the haptic feedback device comprises a temperature sensor arranged to measure a temperature of the environment where the haptic feedback device is located, and the control unit is arranged to control the temperature feedback actuator in relation to the environmental temperature.

According to an embodiment, the humidity feedback actuator comprises at least one fluid channel having an exit port arranged on the feedback surface. The fluid channel can supply pressurized fluid (gas, water, aerosol, droplets, vapour . . . ) or can suck fluid under vacuum.

According to an embodiment, the humidity feedback actuator comprises at least one pumping element, adjacent to at least a portion of the fluid channel.

According to an embodiment, the pumping element is a piezoelectric actuator. Piezoelectric actuators can be used to form peristaltic pumps or micro peristaltic pumps so as to deliver to the feedback surface a metered amount of fluid.

According to an embodiment, the texture feedback actuator comprises the same piezoelectric actuator or same kind of piezoelectric actuator than the pumping element. In other words, the same piezoelectric actuator can be used to modify a texture, 3D aspect of the feedback surface, as well as to force a fluid movement in the fluid channel.

According to an embodiment, the haptic feedback device comprises a plurality of haptic actuators provided on or in vicinity of the feedback surface and arranged to define a grid pattern. Typically, the haptic actuators can be arranged along a X/Y grid to form "pixels" onto the feedback surface. This allows to uniformly cover the feedback surface.

According to an embodiment, the feedback surface comprises a touch pad arranged to detect a contact or a proximity of a member of the user with the feedback surface and/or identify a location on the feedback surface of a contact or a proximity of a member of the user, and the control unit is arranged to control the at least one haptic actuator according to the detected contact or proximity and/or the identified location of contact or proximity.

According to an embodiment, the haptic feedback device comprises a sound emitter connected to the control unit, the control unit is arranged to control the sound emitter according to the remote object data.

According to an embodiment, the haptic feedback device comprises a flavour actuator, comprising at least one (and preferably a plurality of) flavour source, so as to send to the user a flavour generated on the basis of the remote object data.

According to an embodiment, the control unit is arranged to control the sound emitter according to the detected contact or proximity and/or the identified location of contact or proximity.

According to an embodiment, the at least one haptic actuator is a texture feedback actuator, and preferably a piezoelectric actuator, and the control unit is arranged to control the at least one texture feedback actuator:
- according a static mode, to set to the at least one texture feedback actuator or to the feedback surface and over a predetermined static time period an actuated position offset from a rest position, or
- according to a dynamic mode, to impose to the at least one texture feedback actuator or to the feedback surface and over an animation time period a predetermined movement and/or a predetermined animation.

According to the above embodiment:
- in the static mode, the feedback surface texture is changed for once, and along a time sufficiently long to allow the user to drag fingers across the feedback surface or to swipe the feedback surface, so as to estimate the 3D structure
- in the dynamic mode, the feedback surface texture is animated so that even if the user does not move his fingers in contact of the feedback surface, a movement is sensed, which can recreate the feeling of swiping or moving the fingers across the feedback surface.

According to an embodiment, the haptic feedback device comprises a screen connected to the control unit, the control unit is arranged to control the screen according to the remote object data.

A second aspect of the invention relates to a haptic feedback system comprising:
- the haptic feedback device according to the first aspect,
- a remote server storing remote object data, wherein the remote server and the haptic feedback device are arranged to be connected together via a network, such as internet network.

A third aspect of the invention relates to a method for selling a remote object to a user, comprising the steps of:
- providing to the user the haptic feedback device according to the first aspect,
- displaying at least one remote object to the user,
- sending remote object data to the haptic feedback device,
- actuating the at least one haptic actuator according to the remote object data, so as to provide haptic feedback to the user via the feedback surface.

Other features and advantages of the present invention will appear more clearly from the following detailed description of particular non-limitative examples of the invention having features which can be taken alone or in combination, illustrated by the appended drawings where:

FIG. 1 represents of a haptic feedback system comprising a haptic feedback device for providing to a user a haptic feedback of a remote object;

FIG. 2 represents a simplified cross section of the haptic feedback device of FIG. 1, provided with feedback actuators such as texture feedback actuators, temperature feedback actuators and humidity feedback actuators;

FIGS. 3a and 3b represent alternative embodiments of the humidity feedback actuators of FIG. 2.

FIG. 1 shows a haptic feedback system comprising:
- a user installation 10 comprising an electronic apparatus 12 and a haptic feedback device 11,
- remote objects 20 having remote object data 30,
- a network 40.

The user installation 10 comprises the electronic apparatus 12 and the haptic feedback device 11. The electronic apparatus 12 may be connected to the network 40 and to the haptic feedback device 11. Any kind of connection between electronic apparatus 12, network 40 and haptic feedback device 11 is possible: by wire, by radio waves such as WiFi, Bluetooth, 4G, 5G . . . .

As will be detailed hereunder, the haptic feedback device 11 generally comprises:
- an input unit 114 for receiving remote object data 30,
- at least one feedback surface 111 arranged to be touched or sensed by a user,
- at least one haptic actuator 112 arranged for providing a change on the feedback surface 111,
- a control unit 113:
  - connected to the input unit 114 to receive the remote object data 30, and
  - connected to the haptic actuator 112, and
  - arranged to control the haptic actuator 113 according to the received remote object data 30 so as to provide haptic feedback to the user.

The remote objects 20 can be any kind of good, and the example of FIG. 1, a piece of cloth or a smartphone are given as examples. These remote objects 20 are associated to remote object data 30 which are files including data related to each remote object 20.

For example, remote object data 30 can be files comprising:
- data linked to a 3D structure of a surface of the remote object 20, such as texture, a 3D relief, roughness, rugosity . . . , and/or
- data linked to a mechanical property of a surface of the remote object 20, such as rigidity, elasticity . . . and/or
- data linked to a thermal property of a surface of the remote object 20, such as capacity of heating or cooling, thermal conductivity, thermal capacity . . . and/or
- data linked to a soaking, sponging, moisturizing property of a surface of the remote object 20, such as soaking capacity, moisture level, sponging capacity . . . .

For each of the above parameters, it is possible to quantify on a 0-100 scale the surface of the remote object 20 and to include this quantification in the remote object data 30. For example, in regards to:
- elasticity, one can set a test where a 5 cm×5 cm surface is subjected to a weight of 500 g applied on its middle on a surface of 1 cm 2, and deflection is measured. If deflection is lower than 0.1 mm (a piece of glass), elasticity is rated to 0, and if deflection is equal to or greater than 10 mm (a piece of cloth, such as a cotton fabric), elasticity is rated to 100, and any surface having a deflection between 0.1 mm and 10 mm can be rated between 0 and 100;
- thermal conductivity, one can rate to 0 high insulating materials having a thermal conductivity lower than 0.05 $W \cdot m^{-1} \cdot K^{-1}$ (such as expanded polystyrene having thermal conductivity of 0.036 $W \cdot m^{-1} \cdot K^{-1}$, wool having thermal conductivity of 0.04 $W \cdot m^{-1} \cdot K^{-1}$ . . . ) and one can rate to 100 highly conductive materials having a thermal conductivity greater than 200 $W \cdot m^{-1} \cdot K^{-1}$ (such as copper having thermal conductivity of 390 $W \cdot m^{-1} \cdot K^{-1}$, aluminium having thermal conductivity of 237 $W \cdot m^{-1} \cdot K^{-1}$ . . . ). Any material having a thermal conductivity between 0.05 $W \cdot m^{-1} \cdot K^{-1}$ and 200 $W \cdot m^{-1} \cdot K^{-1}$ can be rated between 0 and 100
- roughness or texture, one can measure the roughness according to arithmetic rugosity Ra in μm and a surface with a rugosity Ra lower than 0.2 μm ("mirror-polished") can be rated as 0, and a surface with a rugosity Ra equal to or greater than 1000 µm (raw concrete) soaking, sponging, moisturizing properties, one can consider the viscosity or capillarity to rate between 0 and 100 the material of the remote object 20. For example, one can rate to 0 a surface where a contact angle of a water droplet resting on said surface is lower than 20° (wetting surface) and one can rate to 100 a surface where a contact angle of a water droplet resting on said surface is greater than 120° (hydrophobic surface) . . . . Alternatively or in addition, one can rate to 0 a material having a low viscosity which is lower than 0.001 Pa·s (such as water) and one can rate to 100 a material having a high viscosity which is greater than 1000 Pa·s (such as peanut butter . . . ). Still further, one can rate to 0 a surface completely dry and one can rate to 100 a surface fully wet, i.e. recovered of a layer of liquid.

The remote object data 30 can be generated by the manufacturer of the remote object, or by the retailer, or any entity having physical access to the remote object 20. Typically, in the frame of internet sales, the remote objects are pictured before the internet selling websites offer them for sale, and the remote object data could be generated at this stage, passing through a process of testing to measure the above mentioned physical parameters. Once the remote object data 30 are generated, they can be included in electronic files which can be stored on a remote server, or in the so-called "cloud".

Reverting to the haptic feedback system of FIG. 1, when the user is looking at pictures of a remote object 20 downloaded from the network 40 and displayed onto the display of user electronic device 12, the corresponding remote object data 30 are sent to the user installation 10 and in particular to the haptic feedback device 11 so that the user can be provided with an enriched experience by touching the feedback surface 111. As will be explained in more detail below, the feedback surface texture or temperature or moisture can be changed to reflect the characteristics of the remote object 20.

In detail, FIG. 2 shows an internal structure of the haptic feedback device 11, where haptic actuators 112 are provided in vicinity of the feedback surface 111. As can be seen on FIG. 2, three rows of haptic actuators 112 are provided beneath the feedback surface 111. A first row is provided with texture feedback actuators 112a, which can be piezoelectric actuators. A second row of actuators is provided with temperature feedback actuators 112b which can be Peltier elements. A third row of actuators is provided with humidity feedback actuators 112c, which can comprise a fluid channel having an exhaust port onto the feedback surface 111, a reservoir under the second row of temperature feedback actuators 112b and a micro pump.

This structure is an example only, and the texture feedback actuators 112a, temperature feedback actuators 112b and humidity feedback actuators 112c can be arranged on one single row, or on other composite layers mixing one or several kind of haptic feedback actuators 112 . . . .

FIG. 2 shows a cross section of the haptic feedback device 11, and it is possible to arrange the haptic feedback actuators 112 all along the feedback surface, to create a pattern or grid of haptic feedback actuators 112.

The texture feedback actuators 112a, temperature feedback actuators 112b and humidity feedback actuators 112c are shown with relative size and shapes which are different, but this is only for illustration purpose, and one can propose other sizes, shapes and locations.

In particular, FIG. 3a represents a first alternative of the humidity feedback actuator 112c. In this first alternative of FIG. 3a, the humidity feedback actuator 112c is provided with:

a piezoelectric actuator 112c15,
a fluid channel supply 112c14 filed with fluid or liquid,
a one-way valve 112C13,
an intermediate reservoir 112c12 filed with fluid or liquid,
a terminal valve 112c11, closing an exhaust port of the intermediate reservoir 112c12.

The fluid channel supply 112c14 may be connected to a fluid reservoir to feed the humidity feedback actuator 112c of FIG. 3a with fluid or liquid such as water. The piezoelectric actuator 112c15 is coupled and connected to a surface of the fluid channel supply 112c14 in regards or vicinity to the one-way valve 112c13. The piezoelectric actuator 112c15 may act as a pump when actuated, forcing the liquid contained into the fluid channel supply 112c14 to pass through the one-way valve 112c13 and to enter the intermediate reservoir 112c12. The pressure in the intermediate reservoir 112c12 thus increases in the intermediate reservoir 112c12 and the terminal valve 112c11 may be actuated to allow the liquid contained in the intermediate reservoir 112c12 to be expelled out onto the feedback surface 111.

One can note that the one-way valve 112C13 and/or the terminal valve 112c11 are optional and may be omitted. The intermediate reservoir 112c12 may also be flexible so that its volume may increase under the action of the pressure. The one-way valve 112c13 may comprise a spring to push the ball downwards or may be electrically actuated. The terminal valve 112c11 may be a check valve, a one-way valve, a membrane, a porous membrane. The terminal valve 112c11 may be formed by two adjacent texture feedback actuators 112a to provide a normally closed valve, which may be actuated in an open position by simultaneously actuating the two adjacent texture feedback actuators 112a so as to open the exhaust channel or port.

FIG. 3b represents a second alternative of the humidity feedback actuator 112c. In this second alternative of FIG. 3b, the humidity feedback actuator 112c is provided with:

a piezoelectric actuator 112c23,
a reservoir 112c22 containing liquid,
an aerosol generator 112c21, located at same level or underneath an exhaust port of the reservoir 112c22.

The piezoelectric actuator 112c23 may be used as a pump or pressure generator to increase the pressure in the reservoir 112c22. The aerosol generator 112c21 may be used to generate vapor or aerosol (droplets projected in ambient air) so as to expel vapor or aerosol outside of the haptic feedback device, from the feedback surface 111. The aerosol generator 112c21 may comprise a heating element, and/or an ultrasonic mesh, and may be actuated when or shortly after the piezoelectric actuator 112c23 is actuated to increase the pressure in the reservoir 112c22 to feed or wet the aerosol generator 112c23.

The reservoir 112c22 may also be flexible so that its volume may increase under the action of the pressure. The exhaust port may be provided with a terminal valve similar to that of FIG. 3a (a check valve, a one-way valve, a membrane). If provided in this embodiment, the terminal valve may be formed by two adjacent texture feedback actuators 112a to provide a normally closed valve, which may be actuated in an open position by actuating the two adjacent texture feedback actuators 112a.

The haptic device may also be provided with an internal fluid distribution circuit with pumps, channels, reservoirs, and valves to generate an array of humidity feedback actuators 112c to map the feedback surface 111 with humidity feedback actuators 112c as shown in FIG. 2 and/or FIG. 3a, and/or FIG. 3b. Several reservoirs may also be provided in the haptic feedback device to store different liquids (different nature, different odours or smells) to offer the possibility to adapt the delivery of the humidity feedback (specific liquids delivered on specific positions of the feedback surface, vapor or aerosol or liquid delivered on specific positions of the feedback surface . . . ). Temperature of the liquid or aerosol may also be varied/adapted/tuned based on the remote object. Newtonian fluids may be used. Non-Newtonian fluids (fluids that do not follow Newton's law of viscosity, that is, they have variable viscosity dependent on stress. In non-Newtonian fluids, viscosity can change when under force to either more liquid or more solid) may be used. In in this case, specific actuators or the texture feedback actuators 112a may be used to change the viscosity of the non-Newtonian fluids so as to add more possibilities to provide haptic feedback (texture feedback and/or humidity feedback). As example of non-Newtonian fluids, one may use: soap solutions, cosmetics, polyvinyl alcohol-based glues and borax, suspension of starch, silicone polymer based suspension.

Reverting to the enriched experience of the user, the remote object data 30 are received by the input unit 114 and sent to the control unit 113. Then, the control unit 133 can specifically control the haptic feedback actuators 112 according to the received remote object data 30, to impose a change to the feedback surface to imitate or reproduce an aspect of the corresponding remote object 20.

In particular, if the remote object 20 has a surface with a specific 3D texture, the control unit can control the texture feedback actuators 112a so as to imitate this specific 3D structure. In a first static mode, the texture feedback actuators 112a can be controlled so as to be displaced or so as to induce a structural change on the feedback surface 111 for a given time during which the user can feel the texture by dragging his fingers. In a second dynamic mode, the texture feedback actuators 112a can be controlled so as to be dynamically displaced or so as to induce a structural change on the feedback surface 111 during a given actuating time during which the user can feel the texture "moving" under his fingers, even if the latter are static relatively to the feedback surface.

In addition, the below aspects related to piezoelectric actuators can be considered:

Piezoelectric Actuators can be Used for Imitating Normal Vibration

To create a normal vibration an actuator is placed in the periphery of the feedback surface 111 and creates a mechanical vibration that propagates inside the material and reaches the finger. This type of stimulation is directly detectable by our finger system if it occurs at a frequency below 1 kHz.

More complex uses can be imagined by having several actuators placed at different positions. By modulating the waves generated it is possible to make them interfere and thus allow more complex, localized, static or dynamic textures.

Piezoelectric can be Used for Imitating Pulses

Short vibration pulses can be used to generate tactile effects in the normal direction. The mechanical excitation of the feedback surface 111 produces echoes, which have to be cancelled out in order to obtain a short burst of normal displacement at a specific location. For that purpose, multiple actuators are placed on the feedback surface, and they are synchronized in order to create constructive and destructive interference.

Piezoelectric can be Used for Imitating Lateral Vibration

The lateral movement between the finger and the feedback surface 111 can induce tangential forces inside the finger pulp and thus lateral vibrations. By modulating this lateral movement as a function of the finger displacement, it is even possible to render virtual textures on the feedback surface 111. In particular, the finger moves to feel the lateral vibration and the modulation may be a function of time and/or a function of the finger displacement so as to render haptic feedback.

Piezoelectric can be Used for Imitating Ultrasonic Waves Modulation

By using piezoelectric actuators, ultrasonic waves can be generated on the feedback surface 111. The vibration reduces the friction coefficient during a lateral movement between the finger and the feedback surface 111, a phenomenon called active lubrication, because the finger is in intermittent contact with the plate. By modulating the waves generated it is possible to make them interfere and thus allow more complex, localized, static or dynamic textures.

Piezoelectric can be Used for Imitating Electrostatic Modulation

It is possible to increase the friction coefficient by using electrostatic actuation. This involves applying a voltage to a conductive layer of a capacitive screen or the feedback surface 111 to generate electrostatic attractive forces in the normal direction between its surface and a finger sliding on it. This frictional force can be modulated to generate different tactile effects by altering the amplitude, frequency and waveform of the voltage signal applied to the touchscreen.

Piezoelectric Devices can be Used for Imitating Textile Perception

Friction modulation is particularly effective at texture rendering due to its frequency range and inherently passive nature. Virtual textures produced by friction modulation are felt only while a finger brushes against them. Virtual textures can be synthesized by actuating a friction display with a time-varying periodic signal such as a square or sinusoidal wave. The signal is mapped directly to the driving voltage of an electrostatic feedback surface, or modulates the high-frequency carrier signal of an ultrasonic feedback surface.

Further, if the remote object 20 has a specific thermal conductivity, actuation of the temperature feedback sensors 112b can simulate the thermal conductivity. Indeed, if the remote object data 30 comprise the information that the remote object 20 has a high thermal conductivity (like steel or marble), then the temperature feedback sensors 112b can be controlled so as to cool the feedback surface so as to imitate the contact of a steel or marble surface, which feels cold due to high heat conduction. In contrast, if the remote object data 30 comprise the information that the remote object 20 has a low thermal conductivity (like wood or wool), then the temperature feedback sensors 112b can be controlled so as to heat, cool or maintain a pre-set temperature of the feedback surface so as to imitate the contact of a wood surface or wool clothe, which feels rapidly hot or warm due to low heat conduction and rapid local temperature rise. One should consider as well that the temperature felt does not exceed the temperature of the finger. So, for example, because of all the electronics and the room temperature, it may be better to cool the feedback device even when the remote object 20 has a low thermal conductivity Of course, heating or cooling is adjusted per the remote object data 30, and can be further adjusted per local temperature (typically the temperature of the feedback surface 111) so as to give realistic feeling to the user.

Still further, if the remote object 20 has a specific moisture content or specific viscosity, the moisture feedback actuators 112c can be controlled so as to provide the user with specific feedback. In particular, if the remote object surface is hydrophobic, a limited quantity of moisture feedback actuators 112c can be actuated to wet specific spots of the feedback surface 111 to imitate a wetted hydrophobic surface. If the remote object surface is not hydrophobic, all the moisture feedback actuators 112c can be actuated to wet all or almost all the feedback surface 111 to imitate a wetted non-hydrophobic surface.

Still further, if the remote object 20 is a paste highly viscous or highly liquid, the moisture feedback actuators 112c can be actuated in conjunction with the texture feedback actuators 112a to imitate a pasty or liquid remote object 20. Indeed, a large amount of water released on the feedback surface 111 with light and fast vibrations can imitate a very liquid paste, and small amount of water released on the feedback surface 111 with high intensity, low frequency vibrations can imitate a viscous or pasty fluid. Alternatively, one can use only vibrations to reproduce the viscosity of the remote object 20. In such case, it is possible, in relation to a movement of the user's finger detected onto the feedback surface 111, to generate or not vibrations to create or modulate a force opposite to the finger movement. This opposite force can provide feedback of the viscosity of the remote object 20. Water can be added if the remote object 20 is a paste to inform the user about wettability.

Still further, the sponging properties of remote object 20 could also be imitated. By adding a pressure sensor (which can be a piezoelectric sensor used otherwise to modify the texture of feedback surface) to measure the pressure applied by the user, it is possible to pump more liquid and at the same time to contract the feedback actuators 112a to have the sensation of putting finger in a sponge. And the process can be reversed when the finger releases pressure from the feedback surface 111.

Finally, it has to be noted that the moisture feedback actuators 112c can use or share the texture feedback actuators 112a as a pump or micro pump, and the fluid channel can be easily provided adjacent to one or several texture feedback actuators 112a, which can be arranged to generated displacements of a wall of the fluid channel. Such displacements can generate changes of volume in the fluid channel, to force an exhaust of fluid.

Finally, to make the experience more complete for the customer, it is possible to add a sound emitter to imitate the noise made by the product when a finger passes over the product. The remote object data 30 can comprise sound data built from the recording of a standardized probe sled on the surface of the remote object 20 (at a given speed and/or under given pressure) and this sound data is directly sent to the sound emitter. Alternatively or in addition, the sound emitter can be controlled according to a signal built from the other data, in particular the texture data: the signal sent to the sound device can be a standard signal modulated/altered/modified by the rating of the texture of the remote object 20. This sound emitter can be used to provide an enrichment of the feedback.

It is of course understood that obvious improvements and/or modifications for one skilled in the art may be implemented, still being under the scope of the invention as it is defined by the appended claims.

In particular, in regards to the user installation 10, it is possible to connect the haptic device 11 directly to the network 40. It is also possible to provide a "all in one" user installation 10, where the electronic apparatus 12 and its related functions are integrated into the haptic feedback device 11 or vice versa. In other words, the user installation 10 could consist of a single electronic apparatus connected to the network 40 and comprising notably a display, a feedback surface and haptic actuators.

Further, one can provide flavor reservoirs in the haptic feedback device, and the moisture feedback actuators 112c, or dedicated flavor feedback actuator can be used to expel flavors in vicinity of the haptic feedback device.

Still further, the feedback surface 111 can be sectored, or distributed on several faces or locations of the haptic feedback device 11. Some parts of the feedback surface 111 can be dedicated to provide texture feedback only, some other parts can be dedicated to provide temperature feedback, or moisture feedback only, or any combination of these feedbacks.

Finally, the present invention can be used for assisting or enriching an experience of remote purchase, but it can also be used by any user reviewing pictures of a remote object. For example, the haptic feedback device can enhance experience during a review of prototype parts from a remote location, during a review of objects pictured and published on internet, on websites, on social media . . . .

The invention claimed is:
1. A haptic feedback device, comprising:
an input unit for receiving remote object data;
at least one feedback surface arranged to be touched or sensed by a user;
at least one haptic actuator arranged for providing a change on the feedback surface; and
a control unit:
connected to the input unit to receive the remote object data,
connected to the haptic actuator, and
arranged to control the haptic actuator according to the received remote object data so as to provide haptic feedback to the user.
2. The haptic feedback device according to claim 1, wherein the at least one haptic actuator is chosen in the list of:
a texture feedback actuator,
a temperature feedback actuator,
a humidity feedback actuator.
3. The haptic feedback device according to claim 2, wherein the texture feedback actuator comprises a piezoelectric actuator.
4. The haptic feedback device according to claim 2, wherein the temperature feedback actuator comprises a heating or cooling element.
5. The haptic feedback device according to claim 4, wherein the temperature feedback actuator comprises a Peltier element and/or a resistive element.
6. The haptic feedback device according to claim 2, wherein the humidity feedback actuator comprises at least one fluid channel having an exit port arranged on the feedback surface.
7. The haptic feedback device according to claim 6, wherein the humidity feedback actuator comprises at least one pumping element, adjacent to at least a portion of the fluid channel.
8. The haptic feedback device according to claim 7, wherein the pumping element is a piezoelectric actuator.

9. The haptic feedback device according to claim 1, comprising a plurality of haptic actuators provided on or in vicinity of the feedback surface, and arranged to define a grid pattern.

10. The haptic feedback device according to claim 1, wherein the feedback surface comprises a touch pad arranged to detect a contact or a proximity of a member of the user with the feedback surface and/or identify a location on the feedback surface of a contact or a proximity of a member of the user, and wherein the control unit is arranged to control the at least one haptic actuator according to the detected contact or proximity and/or the identified location of contact or proximity.

11. The haptic feedback device according to claim 10, comprising a sound emitter connected to the control unit, wherein the control unit is arranged to control the sound emitter according to the remote object data.

12. The haptic feedback device according to claim 11, wherein the control unit is arranged to control the sound emitter according to the detected contact or proximity and/or the identified location of contact or proximity.

13. The haptic feedback device according to claim 1, wherein the at least one haptic actuator is a texture feedback actuator, and wherein the control unit is arranged to control the at least one texture feedback actuator:
   according a static mode, to set to the at least one texture feedback actuator or feedback surface and over a predetermined static time period an actuated position offset from a rest position, or
   according to a dynamic mode, to impose to the at least one texture feedback actuator or to the feedback surface and over an animation time period a predetermined movement and/or a predetermined animation.

14. The haptic feedback device according to claim 1, comprising a screen connected to the control unit, wherein the control unit is arranged to control the screen according to the remote object data.

15. A haptic feedback system comprising:
   the haptic feedback device according to claim 1; and
   a remote server storing remote object data,
   wherein the remote server and the haptic feedback device are arranged to be connected together via a network.

16. A method for selling a remote object to a user, comprising the steps of:
   providing to the user the haptic feedback device according to claim 1;
   displaying at least one remote object to the user;
   sending remote object data to the haptic feedback device; and
   actuating the at least one haptic actuator according to the remote object data, so as to provide haptic feedback to the user via the feedback surface.

* * * * *